March 9, 1954

H. G. SPIER ET AL 2,671,435

MECHANISM FOR REGULATING FUEL INJECTION
IN FREE PISTON ENGINES

Filed May 12, 1950

2 Sheets-Sheet 1

INVENTORS
Hans G. Spier
BY Robert Lasley

ATTORNEYS

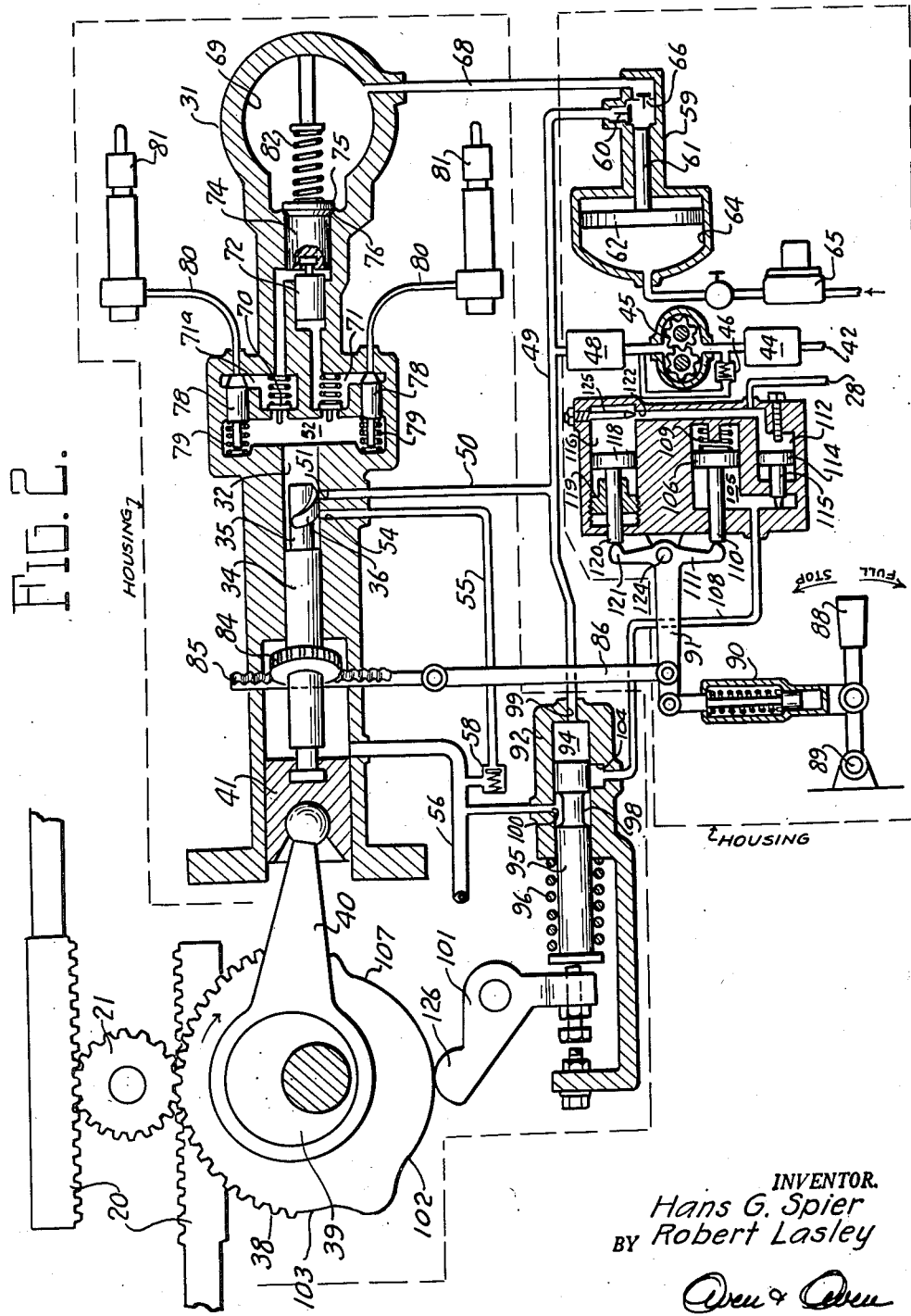

Patented Mar. 9, 1954

2,671,435

UNITED STATES PATENT OFFICE 2,671,435

MECHANISM FOR REGULATING FUEL INJECTION IN FREE PISTON ENGINES

Hans George Spier and Robert Lasley, Hamilton, Ohio, assignors, by mesne assignments, to Baldwin-Lima-Hamilton Corporation, a corporation of Pennsylvania Application May 12, 1950, Serial No. 161,566

7 Claims. (Cl. 123—46)

This invention relates to a fuel injection and starting system for free piston engines, and is particularly directed to the improvement comprising a control mechanism for regulating the injection of fuel.

In starting engines of the free piston type, it is customary to employ a relatively large fuel charge. While this large charge is desirable in the initial combustion cycle, continued feeding of similar large fuel charges is undesirable and unsatisfactory. Manual control means may be employed for cutting back the fuel injection, but this is not sufficiently rapid or positive in its operation. Furthermore, the fuel cut back is preferably followed by a gradual increase in fuel as the engine picks up its load in normal operation.

Various systems of fuel injection have been proposed for free piston engines which differ from those used in conventional compression ignition engines, since the matter of timing the injection as well as varying its quantity are both of utmost importance for successful operation. In conventional engines, a shaft having a complete rotary movement can be timed in relation to the engine crankshaft and used to operate the fuel pumps. In free piston engines such a shaft is not ordinarily available, and further it will be seen that injection takes place at a point in the cycle when the pistons have nearly stopped on their inward strokes. The relatively slow movement of the reciprocating parts makes precise fuel injection timing difficult with equipment patterned after the familiar diesel injection systems. The present invention includes means to determine a change in quantity of fuel injection in accordance with an overstroke of the engine. For each quantity of injected fuel it has been found that there exists an optimum time of injection, so that the invention comprises also a means to reestablish the time of injection as each new setting of fuel quantity is made.

It is, therefore, the primary object of the present invention to provide a fuel injection system for a free piston engine in which the time of injection is varied as the quantity of injected fuel is varied; in which the quantity of injected fuel is either manually or automatically established but capable of automatic variation to compensate for overstroking of the free pistons; in which the quantity of injected fuel is deliberately made abnormally large during starting but cut back to a lesser quantity automatically when the engine is running; and in which means are provided to maintain a constant volumetric ratio of fuel passing through two or more injection nozzles.

Other objects and advantages of the present invention will become apparent from the following detailed description thereof when read in conjunction with the accompanying drawings, in which:

Fig. 1 is a diagrammatic side elevation, partly in section, of a free piston engine, and Fig. 2 is a diagrammatic sectional view of a fuel injection control mechanism representing one embodiment of the present invention.

In the free piston engine shown in Fig. 1, each of the "free pistons" is divided into three parts: a combustion piston 10, a compressor piston 11 and a bounce piston 12. The power cylinder 13 is provided with upper and lower fuel injectors 14 and a scavenging air inlet 15, in addition to the usual exhaust ports 16.

The compressor pistons 11 reciprocate within a compressor cylinder 17, and air from the cylinder 17 may be fed as scavenging air to the power cylinder 13 in the usual manner. The bounce pistons 12 move back and forth in bounce cylinders 18 and the air compressed within the bounce cylinders, in addition to being used as a cushion to restore the pistons to the center of the power cylinder on a compression stroke may be used in controlling the extent and frequency of the strokes of the free pistons. The volume 19' in front of the compressor pistons 11 opposite the compressor cylinder volumes, is used as a reverse bounce cylinder, since the gases within the volume 19' may be used to assist in controlling the movement of the free pistons in the reverse direction. Synchronizing racks 20 are attached to each of the compressor pistons 11 and extend out through the reverse bounce chambers 19 to engage a pinion 21, in this manner assuring synchronous movement of the free pistons. Power from the system is customarily derived as energy contained in the exhaust gases and is converted to work in a turbine or similar consumer.

In starting free piston engines, as disclosed in the co-pending application of Lewis and Morain, Serial No. 633,222, filed December 6, 1945, now Patent 2,600,251, issued June 10, 1952, the first step is to introduce air under pressure into the reverse bounce chambers 19', thus forcing the compressor pistons 11 outwardly into the outermost position. The starting mechanism for the free piston engine disclosed in Fig. 1 is diagrammatically shown, element 22 representing a source of compressed air from which a line 24 leads to volume 19'. Valves 25 control the introduction of air into the reverse bounce chambers 19'. When the pistons 11 have moved outwardly, air pressure is built up within the direct bounce cylinders 18. Dump valves 26 regulate the flow of gas from the reverse bounce chambers 19' and are operated by air pressure from line 28 when valve 29 is open. The tripping of the dump valves 26 upon the opening of the valve 29 relieves the pressure in the reverse bounce chamber and permits the pressure within the direct bounce cylinders 18 to force the free pistons inwardly toward the innermost or combed position. A ballistic timer 30 is so regulated that the air pressure in the line 28 leading to the dump valves 26 drops to about zero (or atmospheric pressure) at the time the free pistons reach a predetermined point in their inward stroke, thus closing the dump valves 26. From this point on, the engine operates with the dump valves closed and air valves 25 and 29 are also closed.

The present invention comprises a novel fuel injection mechanism shown in detail in Fig. 2 and includes a housing 31 having formed therein an injection pump cylinder 32. A pump plunger 34 reciprocates within the cylinder 32 and has a reduced section 35 on which a spiral shaped land segment 36 is formed to control the quantity and time of injection as hereafter described. Reciprocation of the pump plunger 34 is effected by the rotation of a segment gear 38 meshing with synchronizing pinion 21 which actuates in turn an eccentric 39. A connecting rod 40 mounted upon the eccentric 39 is connected to the pump plunger 34 through ball and socket engagement with a crosshead or plunger 41. As a result, the movement of the pump plunger 34 is controlled by the movement of the free pistons.

Fuel is supplied from a source 42 and passed through a filter 44 into a gear pump 45, which combines with bypass valve 46 to maintain the desired pressure within the fuel lines. A second filter 48 filters the pressurized fuel which then passes into fuel line 49 and through line 50 and port 51 into cylinder 32 and pump cavity 52. A spill port 54 is connected by line 55 to a drain 56 through a check valve 58.

Fuel line 49 is connected to an accumulator pump 59 through a one-way valve 60. The accumulator pump acts to maintain a body of liquid (conveniently fuel oil) under a very high pressure. A small compressor piston 61 is connected at one end to a drive piston 62 mounted in a drive cylinder 64. By maintaining air pressure in the cylinder 64 from any convenient air source by means of a pressure regulator 65, the compressor piston 61 is made to force fuel oil under high pressure through a one-way valve 66 and feed line 68 into an accumulator volume 69. The ratio of pressure increase from air line to accumulator volume is determined by the relative areas of pistons 62 and 61.

As pump plunger 34 moves inwardly in cylinder 32 fuel is forced from cavity 52 through check valves 70 into separate feed chambers 71, 71a. This introduction of fuel into the feed chambers 71, 71a forces distributor pistons 72 and 74 in the direction of the accumulator and against the high pressure maintained therein by the accumulator pump 59. The triggering needles 78 are held to their seats by the pressure of the fuel being pumped since the area of the rear ends, exposed in chamber 52, is greater than the area of the front ends exposed in chambers 71, 71a. When spill port 54 is opened by reason of the land 36 overrunning it, the pressure within cylinder 32 and pump cavity 52 is relieved. The pressure at the rear of the resiliently mounted triggering needles 78 is thus reduced and the needles are moved rearwardly against the mounting springs 79 by the pressure of the fuel on the front ends within the feed chambers 71, 71a thus permitting fuel to flow through lines 80 to nozzles 81. Since distributor pistons 72 and 74 are mechanically interconnected, the quantity of fuel delivered to the nozzles 81 will vary in direct proportion to the bottom area of the respective distributing pistons. It will be seen that the pressure of injection is determined by the pressure in the accumulator volume 69 and not directly by the injection pump. Further, the time of injection is determined by the time of opening spill port 54 to relieve the pressure in the pump chamber 52, which time is determined by the shape of the outer side of segment or land 36. A constant injection time could be obtained if this land were to be formed as a circle normal to the axis of the pump plunger 34. It has been found, however, that for each quantity of fuel, or for each engine load, there exists a different optimum time of injection. The outer surface of land 36 is thus ground to maintain this optimum timing with each setting of the pump plunger 34.

In prior devices of this character, in which fuel is forced through the nozzles by accumulated pressure, the time of cut-off is determined solely by the time when the nozzle springs or the springs tending to seat the valves 78 overcome the accumulator pressure. As these forces approach each other in magnitude there is a tendency for the valves to bounce so that the last of the injection is made irregularly and in an uncertain manner. By the present invention piston 74 is provided with an enlarged head 75 which cooperates with a seat 76 in the accumulator body to limit the extent of movement of piston 74 in the direction which caused injection. Since the pressure of the accumulator drops only slightly during injection, the time of cut-off is determined entirely by the time when head 75 strikes seat 76 and not by any drop in pressure in the accumulator, and all of the fuel is injected under high pressure.

The plunger 34 may be varied in position by turning it in the cylinder in a manner well known in the art. The plunger is thus diagrammatically shown as carrying a gear 84 adapted to mesh with a positioning rack 86. As the rack is moved to rotate gear 84 the position of the land 36 will be changed so that both the quantity of fuel and the time of injection will be varied. The present invention provides a manual and overriding automatic means to move the fuel rack.

The fuel rack is connected to an operating rod 86 which can be manually moved by a handle 88 pivoted at 89. A spring link 90 is provided between these elements, however, so that the rod 86 and its associated rack can be moved independently of the manually set handle. A T-shaped lever 91 is also connected at one of its ends to rod 86 between spring link 90 and the injection pump.

Automatic resetting of the fuel rack is accomplished in the present invention for two purposes. In the first place, overstroking of the free pistons may be taken as an indication that more fuel is being injected than is required to carry the load to which the machine is subjected at that time. For this reason, a device is provided to cut back the fuel in the event of overstroking, the device being responsive to piston position. Secondly, the fuel rack is adapted by the present invention to be moved quickly, upon starting, from a position in which a relatively great quantity of fuel is injected to a position in which the fuel is greatly cut back. While these devices are inter-related in that they contribute to adjustment of the fuel rack position, they will be described in turn.

The overstroke control valve comprises a casing 92 in which is formed a cylinder 94. A plunger 95 is resiliently positioned by means of a spring 96 within the cylinder 94 and has a passage 98 formed therein. An inlet port 99 connects the cylinder 94 with fuel line 49 and port 100 connects cylinder 94 to the drain 56. Plunger 95 is reciprocated within the cylinder 94 by a bell crank lever 101 which in turn is actuated by cam 102, integral in this particular embodiment with segment gear 38.

Cam 102 has its contour cut with slightly increasing height as the pistons recede from each other up to the point where the normal outward stroke of the pistons is exceeded at which point the contour of the cam increases sharply. Thus in normal stroking of the engine pistons the motion of plunger 95 is a reduced and reversed reproduction of the motion of one of the engine pistons so that as the engine pistons move farther into the bounce cylinders plunger 95 moves farther to its cylinder 94. The plunger 95, bell crank 101 and cam 102 are so associated that, during normal stroke operation of the free piston engine, plunger 95 intermittently connects only the inlet port 99 and outlet port 104 but during an abnormally long outward stroke or overstroke of the free pistons, plunger 95 moves inwardly into cylinder 94 sufficiently to connect outlet port 104 with drain port 100 to rapidly withdraw fluid from cylinder 105.

A control cylinder 105 is connected by a line 108 to the outlet port 104 of the overstroke control valve so that fluid (conveniently fuel oil) is supplied through line 108 to the cylinder 105 on one side of a piston 106. A spring 109 engages the opposite side of the piston 106. A piston rod 110 is connected to the piston 106 and engages an end 111 of the T-shaped lever 91 whenever the engine is overstroking, but is otherwise held out of contact with the T-shaped lever 91.

Under normal operating conditions, the piston 106 stands in the innermost position in control cylinder 105 against a stop in the cylinder and spring 109 is compressed. The spring is held in this position by reason of the fact that inlet port 99 and outlet port 104 are connected to charge the control cylinder at each reciprocation of the pistons and in the absence of an overstroke which would simultaneously connect outlet port 104 with drain port 100 fluid will be supplied to control cylinder 105 but will not be drained from it. When oil is drained from cylinder 105 by reason of an engine overstroke which simultaneously connects ports 104 and 100, spring 109 immediately forces piston 106 outwardly of its cylinder against arm 111 and thus forces the lever 91 to pivot and move fuel rack 85 in the direction of cut-off so that the subsequent stroke of the pistons is made with less fuel injected.

The body in which cylinder 105 is formed is also provided with the mechanism which controls the fuel quantity upon starting of the unit. Thus, a second cylinder 112 is located adjacent cylinder 105 and has a piston 114 reciprocably mounted therein. A projection 115 is formed on the piston 114 and extends into cylinder 105 so as to displace a predetermined quantity of fuel.

A third cylinder 116 has a reciprocably mounted piston 118 positioned therein and limited in its downward movement by an adjustable seat 119. A piston rod 120 is connected to the piston 118 and engages an arm 121 of T-shaped lever 91 opposite to the fulcrum from arm 111. Cylinders 112 and 118 are connected to the dump valve air feed supply 28 through a common passageway 122.

The mechanism associated with cylinders 112 and 116 acts primarily upon starting of the free piston engine. Preparatory to starting the engine, the manual control lever 88 is set in the desired position, air is introduced into the reverse bounce spaces and the pistons are moved back to the farthest position. The high point 103 of the cam 102 thus is in engagement with the bell crank 101, forcing the plunger 95 into the cylinder 94 until outlet port 104 and spill port 100 are interconnected. As a result, fluid fills cylinder 105 on one side of the piston 106, but is under no pressure. As previously noted, the engine pistons are permitted to move in on their initial strokes by pneumatically opening dump valves 26 through line 28. The air pressure from the dump valve air feed line 28 forces the projection 115 carried by the piston 114 into cylinder 105 and into seating engagement with one wall thereof. This same air pressure forces the piston 118 downwardly so that piston rod 120 engages arm 121 of the T-shaped lever 91 with sufficient force to counter-balance the pressure of the spring 109 against the piston 106. As the free pistons move inwardly toward each other, the cam 102 rotates toward its high point 107, thus withdrawing plunger 95 from cylinder 94 until inlet port 99 is connected to outlet port 104 and filling cylinder 105 with fluid under pressure. At the same time the injection pump plunger 34 moves upwardly, and fuel is injected through nozzles 81.

At about this point in the cycle the ballistic timer 30 opens the dump valve air feed line to the atmosphere, so that the air pressure above pistons 114 and 118 is reduced to almost atmospheric pressure. Hence, the pressure of fluid within the cylinder 105 forces the projection 115 back into the cylinder 112, which in turn reduces the pressure within cylinder 105. Simultaneously, the force exerted by the piston rod 120 against the arm 121 of the T-shaped lever 91 is removed so that the force exerted by spring 109 is now opposed only by the reduced pressure of the fuel within the cylinder 105. Consequently, piston 106 forces the piston rod 110 against the arm 111 causing the T-shaped lever 91 to rotate about its pivot point 124 and move the arm 86 and rack 85, causing rotation of the pinion 84 in the direction of reducing the quantity of fuel that will be injected on the next stroke.

After the original cut back of the fuel injection, oil pressure is gradually returned to normal within cylinder 105 due to intermittent connections between inlet port 99 and outlet port 104 through the cylinder 94. Since the pressure of the fuel and pressure of spring 109 on piston 106 balance one another, the pressure exerted by the spring link 90 against the end of the T link 91 gradually restores the fuel injection to that position previously established manually by the manual control lever 88.

If it is found desirable to make the cut back of injected fuel quantity gradual, a needle valve 125 may be positioned in cylinder 116 adjacent the inlet passage 122, to limit the rate at which piston 118 and associated piston rod 120 can follow the reduction in pressure in the dump valve air line 28. This damping of the action can be carried to any desired extent.

It is apparent from the above detailed description that the present invention provides control mechanism for regulating both the timing and quantity of fuel injection into a free piston engine, and furthermore, that this mechanism requires relatively few elements other than those normally associated with engines of this type. Also, the control mechanism comprising the present invention includes but a single pressure sensitive element which is used to provide both the automatic cut back when starting the free piston engine as well as for reducing the fuel injection upon overstroking of the free pistons.

Numerous variations and modifications may be made in the particular embodiment of the invention set forth in the accompanying drawings and described in detail above. For example, fluid pressure from some source other than the fuel feed lines may be employed to operate piston 106 and is associated elements. Also, other sources of air or other types of fluid pressure may be employed in place of the air feed from the dump valve supply. These particular sources of fluid pressure are, however, the most convenient and advantageously employed. Other variations will become apparent to those skilled in the art.

What we claim is:

1. In a fuel injection system for a free piston engine which includes a fuel injection pump, means for regulating the quantity of fuel injected by said pump, and operating means driven by a piston of the engine for actuating the fuel injection pump, the improvement which includes a control cylinder, a piston adapted to reciprocate within the control cylinder, means to supply fluid under pressure to the cylinder on one side of said piston, means for exerting pressure against the other side of said piston, a second cylinder, a piston mounted in said second cylinder and adapted to reciprocate therein, a projection connected to one side of the second piston and extending into the first cylinder to displace a portion of the fluid therein, means for supplying fluid under pressure to the other side of said second piston, means associated with the starting mechanism for the free piston engine for regulating the pressure of the fluid supplied to the second cylinder so that full pressure is applied at the initiation of the first stroke of the free piston of the engine and drops to approximately zero near the termination of the first stroke, said drop in pressure causing the projection on said second piston to withdraw from said control cylinder and thus reduce the fluid pressure therein, and a piston rod connected to the first piston and engaging the fuel regulating means whereby a drop in pressure of the fluid in the control cylinder effects a reduction in the quantity of fuel injected into the engine on subsequent strokes.

2. In a fuel system for a free piston engine which includes a fuel injection pump, means operably connected to at least one of the free pistons of the engine for actuating the pump, means for varying simultaneously the quantity and time of fuel injection effected by said pump, a control mechanism including a member adapted to engage and operate the fuel varying means, fluid pressure means for operating said member so that a reduction in the pressure of the fluid produces a reduction in the quantity of fuel injected, means responsive to the starting mechanism of the engine to reduce said fluid pressure, and independent means responsive to an overstroke of the free piston to reduce the fluid pressure.

3. In a fuel injection system for a free piston engine, a fuel pump cylinder having intake, outlet and spill ports, a piston in said cylinder having a helical land thereon of sufficient extent to cover said intake and spill ports simultaneously and during such interval to force fuel through said outlet ports, separated pressure chambers receiving fuel from said outlet ports, an accumulator, means under accumulator pressure for resisting the entry of fuel into said pressure chambers and for maintaining fuel in said chambers under injection pressure, a plurality of fuel nozzles corresponding in number to and adapted to be brought into communication with said pressure chambers, and trigger valves associated with each pressure chamber and normally closing communication between the pressure chamber and associated nozzle, said trigger valves each having a portion exposed to the pressure in said fuel pump cylinder and a portion of smaller area exposed to the pressure in the pressure chamber with which it is associated, whereby said trigger valves are opened by pressure in said pressure chambers when the pressure in said pump cylinder is reduced, by opening of said spill port.

4. In a fuel injection system in accordance with claim 3, separated pressure chambers of different volume.

5. In a fuel injection system in accordance with claim 4 in which said helical land is rotatable and has its outermost surface formed spirally whereby the time of uncovering said spill ports is changed as said land is rotated.

6. In a fuel injection system is accordance with claim 3 in which said helical land is rotatable and has its outermost surface formed spirally whereby the time of uncovering said spill ports is changed as said land is rotated.

7. In a fuel injection system in accordance with claim 3 and positive means to determine the end of the injection period, said means being constantly exposed to accumulator pressure on one side.

HANS GEORGE SPIER.
ROBERT LASLEY.

References Cited in the file of this patent

UNITED STATES PATENTS

| Number | Name | Date |
| --- | --- | --- |
| 1,850,250 | Von Salis | Mar. 22, 1932 |
| 1,919,601 | Simmen | July 25, 1933 |
| 2,200,892 | Pescara | May 14, 1940 |
| 2,405,043 | Meitzler | July 30, 1946 |
| 2,461,224 | Meitzler | Feb. 8, 1949 |
| 2,469,739 | Meitzler | May 10, 1949 |
| 2,497,091 | Morain et al. | Feb. 14, 1950 |
| 2,502,127 | Chittenden et al. | Mar. 28, 1950 |